(12) United States Patent
Cho

(10) Patent No.: US 12,719,259 B2
(45) Date of Patent: Aug. 25, 2026

(54) OVERCURRENT PROTECTION APPARATUS AND PROTECTION METHOD THEREOF

(71) Applicant: SAMSUNG SDI CO., LTD., Yongin-si (KR)

(72) Inventor: Kyu Sung Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 313 days.

(21) Appl. No.: 18/413,203

(22) Filed: Jan. 16, 2024

(65) Prior Publication Data

US 2025/0141204 A1 May 1, 2025

(30) Foreign Application Priority Data

Oct. 31, 2023 (KR) ........................ 10-2023-0148106

(51) Int. Cl.
*H02H 3/00* (2006.01)
*H02H 1/00* (2006.01)
*H02H 3/08* (2006.01)

(52) U.S. Cl.
CPC ............ *H02H 3/08* (2013.01); *H02H 1/0007* (2013.01)

(58) Field of Classification Search
None
See application file for complete search history.

(56) References Cited

U.S. PATENT DOCUMENTS

| | | | | |
|---|---|---|---|---|
| 4,945,445 | A | 7/1990 | Schmerda et al. | |
| 10,340,708 | B2 * | 7/2019 | Shim | H02J 7/0013 |
| 2003/0141847 | A1 * | 7/2003 | Fujiwara | H02J 7/0031 320/134 |
| 2012/0212871 | A1 | 8/2012 | Taniguchi | |
| 2017/0062876 | A1 * | 3/2017 | Narla | B60L 3/0046 |
| 2022/0340020 | A1 * | 10/2022 | Papadopoulos | B60K 1/04 |

FOREIGN PATENT DOCUMENTS

| | | | |
|---|---|---|---|
| CN | 217824338 | U | 11/2022 |
| WO | WO 2011/148592 | A1 | 12/2011 |
| WO | WO 2021/045669 | A1 | 3/2021 |

OTHER PUBLICATIONS

Extended European Search Report issued on Sep. 20, 2024 in the corresponding European Patent Application No. 24164520.9.

* cited by examiner

*Primary Examiner* — Stephen W Jackson
(74) *Attorney, Agent, or Firm* — Lee IP Law, P.C.

(57) ABSTRACT

An overcurrent protection apparatus includes a current sensor configured to measure a charging current or discharging current of a battery pack, a switch configured to connect or disconnect the battery pack, and an overcurrent protection circuit configured to receive an output signal of the current sensor as an input voltage to compare the input voltage and a reference voltage, allow the switch to maintain an on state when the input voltage is less than the reference voltage according to a comparison result, and control the switch so that the switch is turned off after a predetermined time delay when the input voltage is greater than or equal to the reference voltage. A corresponding overcurrent protection method for the battery pack is also provided.

17 Claims, 6 Drawing Sheets

FIG. 4

220
222
DELAY UNIT
230
SWITCH
COMPARISON UNIT
221
223
LATCH UNIT
210
CURRENT SENSOR

OVERCURRENT PROTECTION APPARATUS AND PROTECTION METHOD THEREOF

CROSS-REFERENCE TO RELATED APPLICATION

This application claims priority to and the benefit of Korean Patent Application No. 10-2023-0148106, filed on Oct. 31, 2023, the disclosure of which is incorporated herein by reference in its entirety.

BACKGROUND

1. Field

The present disclosure relates to an overcurrent protection apparatus, which protects a control device or battery from an overcurrent, and a protection method thereof.

2. Description of the Related Art

Secondary batteries are batteries, which can be charged and discharged, unlike primary batteries, which cannot be charged. Low-capacity secondary batteries are used in small portable electronic devices such as smartphones, feature phones, laptop computers, digital cameras, and camcorders, and large-capacity secondary batteries are widely used as motor driving power sources, power storage batteries, and the like in hybrid vehicles, electric vehicles, and the like. Such secondary batteries include an electrode assembly composed of a positive electrode and a negative electrode, a case which accommodates the same, and an electrode terminal connected to the electrode assembly.

The secondary battery is charged by a charging current applied from the outside and outputs a discharge current and supplies the discharge current to a load.

A battery management system (BMS) is connected to the secondary battery as a control device to control the charging and discharging of the secondary battery and monitor a state thereof.

The charging current and discharging current for the secondary battery are measured through a current sensor and managed by the battery management system (BMS), but there is a problem in that the battery management system (BMS) or battery is damaged when an overcurrent occurs.

Accordingly, the battery management system (BMS) or battery may include a protection apparatus which detects and blocks the overcurrent when the overcurrent occurs.

Generally, a method of determining the magnitude of a current and blocking the current using a microprocessor is used in a protection apparatus, but when the microprocessor is not provided, there is a problem in that a circuit is blocked even by a temporary overcurrent and the operation of the system is stopped.

The above-described information disclosed in the background technology of this invention is only for improving understanding of the background of the present invention, and accordingly, can include information which does not constitute the related art.

SUMMARY

Embodiments include an overcurrent protection apparatus. The apparatus includes a current sensor configured to measure a charging current or discharging current of a battery pack; a switch configured to connect or disconnect the battery pack, and an overcurrent protection circuit configured to receive an output signal of the current sensor as an input voltage to compare the input voltage and a reference voltage, allow the switch to maintain an on state when the input voltage is less than the reference voltage according to a comparison result, and control the switch so that the switch is turned off after a delay of a predetermined time when the input voltage is greater than or equal to the reference voltage.

The overcurrent protection circuit may include a comparison unit configured to compare the input voltage and the reference voltage, and a delay unit configured to delay an output of the comparison unit when a high signal is output from the comparison unit.

The overcurrent protection apparatus, wherein the comparison unit may output a low signal when the input voltage is less than the reference voltage, and may output a high signal when the input voltage is greater than or equal to the reference voltage.

The overcurrent protection apparatus, wherein the comparison unit may output a high signal when the input voltage rises due to a temporary overvoltage, and may output a low signal to the switch when the input voltage decreases within the delay time of the delay unit.

The overcurrent protection apparatus, wherein the comparison unit may output a high signal to the switch when the delay time by the delay unit elapses.

The overcurrent protection apparatus, wherein the delay unit may include a first capacitor connected to an output terminal of the comparison unit, and delays the output to the switch while the first capacitor is being charged by the high signal of the comparison unit.

The overcurrent protection apparatus, wherein the delay unit may further include a resistor connected to the first capacitor in parallel, which may allow the output of the comparison unit to be applied to an input terminal of the comparison unit through the resistor when charging of the first capacitor is completed.

The overcurrent protection apparatus, wherein the delay unit may further include a second capacitor connected to an input terminal of the comparison unit, and the delay time may be determined according to a capacity ratio of the first capacitor and the second capacitor.

The overcurrent protection apparatus, wherein the overcurrent protection circuit may further include a latch unit including a diode connected to an input terminal of the comparison unit to maintain the output of the comparison unit to be applied to the input terminal of the comparison unit when the delay time of the delay unit elapses.

The overcurrent protection apparatus, wherein the comparison unit may continuously output a high signal due to the latch unit.

Embodiments include an overcurrent protection method. The method may include comparing, by a comparison unit, an input voltage and a reference voltage when a measurement result for a charging current or discharging current of a battery pack is input as the input voltage from a current sensor, outputting, by the comparison unit, a signal to a switch connected to the battery pack to allow the switch to maintain an on state when the input voltage is less than the reference voltage, delaying, by a delay unit, an output signal of the comparison unit for a predetermined time when the input voltage is greater than or equal to the reference voltage, and outputting, by the comparison unit, the output signal to the switch to turn off the switch when the delay time elapses.

The overcurrent protection method, wherein, in comparing of the input voltage and the reference voltage, the comparison unit may output a low signal when the input voltage is less than the reference voltage, and may output a high signal when the input voltage is greater than or equal to the reference voltage.

The overcurrent protection method, wherein the delaying may include charging a first capacitor connected to an output terminal of the comparison unit using a high signal of the comparison unit.

The overcurrent protection method, wherein the delaying may further include maintaining, by the switch, the on state until charging of the first capacitor is completed.

The overcurrent protection method, wherein, in the delaying, the delay time may be determined according to a capacity ratio of the first capacitor of the delay unit and a second capacitor connected to an input terminal of the comparison unit.

The overcurrent protection method, wherein the delaying may include outputting, by the comparison unit, a low signal to the switch when the input voltage decreases within the delay time.

The overcurrent protection method, wherein turning off of the switch may include outputting, by the comparison unit, a high signal to the switch when the delay time elapses, and may turn off the switch by the high signal.

The overcurrent protection method, wherein turning off of the switch may further include applying the output signal of the comparison unit to an input terminal such that the input voltage rises, when the delay time elapses.

The overcurrent protection method, wherein turning off of the switch may further include continuously applying the output signal of the comparison unit to an input terminal by a diode of a latch unit connected to the input terminal of the comparison unit.

The overcurrent protection method, wherein turning off of the switch may further include turning off the switch and blocking a connection of the battery pack.

BRIEF DESCRIPTION OF DRAWINGS

Features will become apparent to those of skill in the art by describing in detail exemplary embodiments with reference to the attached drawings in which:

FIG. 4 illustrates a block diagram of an overcurrent protection circuit according to one embodiment of the present invention;

DETAILED DESCRIPTION

Figure 1A:
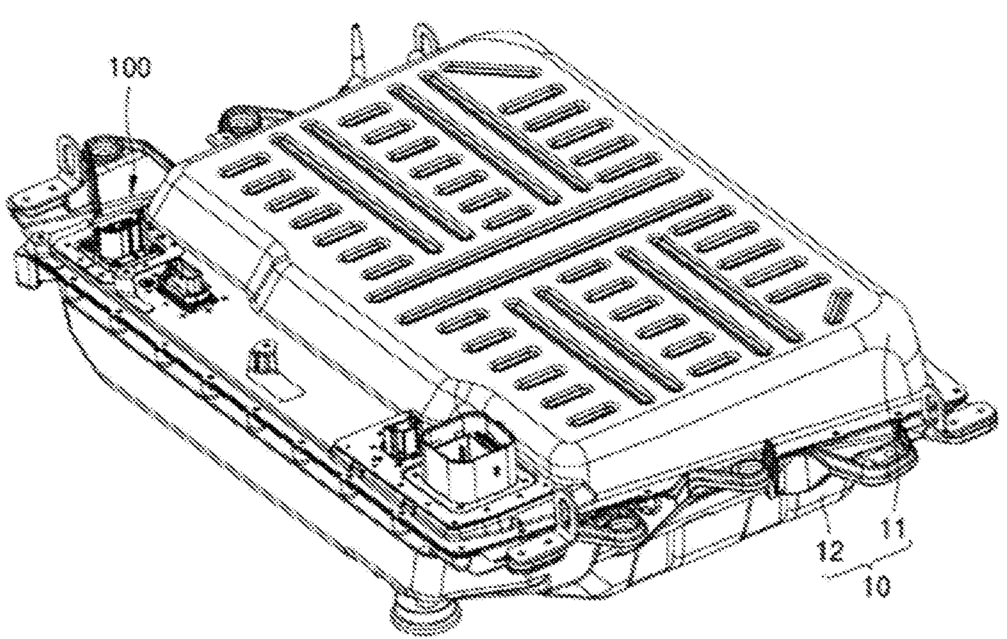
FIGS. 1A and 1B illustrate examples of a battery pack according to one embodiment of the present invention.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain his/her invention in the best way.

In the drawing figures, the dimensions of layers and regions may be exaggerated for clarity of illustration. It will also be understood that when a layer or element is referred to as being “on” another layer or substrate, it can be directly on the other layer or substrate, or intervening layers may also be present. Further, it will be understood that when a layer is referred to as being “under” another layer, it can be directly under, and one or more intervening layers may also be present. In addition, it will also be understood that when a layer is referred to as being “between” two layers, it can be the only layer between the two layers, or one or more intervening layers may also be present. Like reference numerals refer to like elements throughout.

The embodiments described in this specification and the configurations shown in the drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

It will be understood that when an element or layer is referred to as being “on,” “connected to,” or “coupled to” another element or layer, it may be directly on, connected, or coupled to the other element or layer or one or more intervening elements or layers may also be present. When an element or layer is referred to as being “directly on,” “directly connected to,” or “directly coupled to” another element or layer, there are no intervening elements or layers present. For example, when a first element is described as being “coupled” or “connected” to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term “and/or” includes any and all combinations of one or more of the associated listed items. Further, the use of “may” when describing embodiments of the present disclosure relates to “one or more embodiments of the present disclosure.” Expressions, such as “at least one of” and “any one of,” when preceding a list of elements, modify the entire list of elements and do not modify the individual elements of the list. When phrases such as “at least one of A, B and C, “at least one of A, B or C,” “at least one selected from a group of A, B and C,” or “at least one selected from among A, B and C” are used to designate a list of elements A, B and C, the phrase may refer to any and all suitable combinations or a subset of A, B and C, such as A, B, C, A and B, A and C, B and C, or A and B and C. As used herein, the terms “use,” “using,” and “used” may be considered synonymous with the terms “utilize,” “utilizing,” and “utilized,” respectively. As used herein, the terms “substantially,” “about,” and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

When an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

In addition, it will be understood that when an element is referred to as being "coupled," "linked" or "connected" to another element, the elements may be directly "coupled," "linked" or "connected" to each other, or an intervening element may be present therebetween, through which the element may be "coupled," "linked" or "connected" to another element. In addition, when a part is referred to as being "electrically coupled" to another part, the part can be directly connected to another part or an intervening part may be present therebetween such that the part and another part are indirectly connected to each other.

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

Figure 1B:
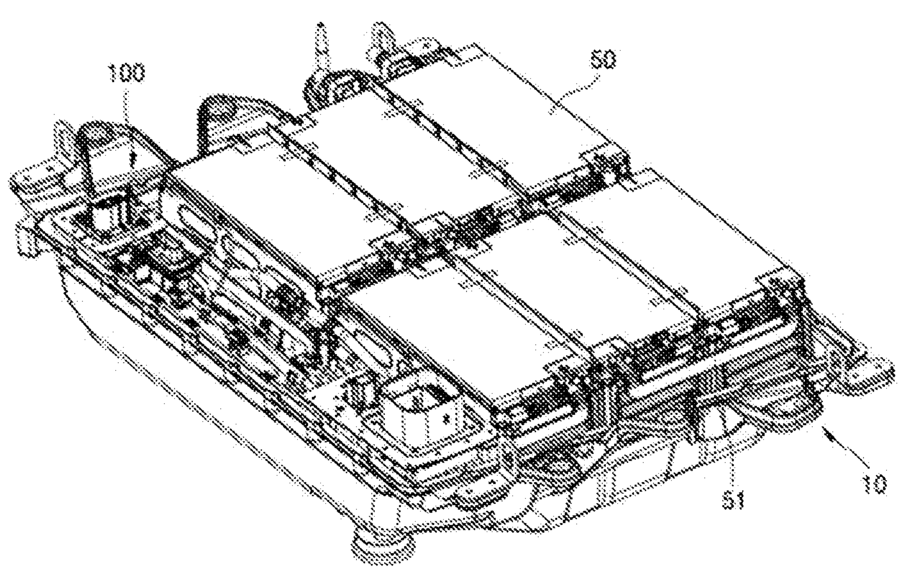

FIGS. 1A and 1B are views illustrating examples of a battery pack according to one embodiment of the present invention.

A battery pack 100 may include a plurality of battery modules 50 and a housing 10 for accommodating the plurality of battery modules 50. For example, the housing 10 may include first and second housings 11 and 12 coupled to each other in facing directions with the plurality of battery modules 50 interposed therebetween. The plurality of battery modules 50 may be electrically connected to each other using a bus bar 51, and the plurality of battery modules 50 may be electrically connected to each other in a series/parallel manner or series-parallel mixed manner to provide a required electrical output.

The battery pack 100 includes one or more battery modules and a pack housing formed with an accommodation space which accommodates the one or more battery modules 50.

The battery module 50 may include a plurality of battery cells and a module housing. The battery cells may be accommodated in the module housing in a stacked form. The battery cell may include a positive electrode lead and a negative electrode lead. According to a shape of the battery, a circular type battery cell, a prismatic type battery cell, or a pouch type battery cell may be used.

In the battery pack 100, one cell stack instead of the battery module may configure one module. The cell stack may be accommodated in the accommodation space of the pack housing or may be accommodated in an accommodation space partitioned by a frame, partition wall, or the like.

The battery cells generate a large amount of heat during charging/discharging. The generated heat is accumulated in the battery cells and accelerates the deterioration of the battery cells. Accordingly, the battery pack further includes a cooling member to suppress battery cell deterioration. The cooling member may be provided at a lower portion of the accommodation space where the battery cells are provided, but is not limited to thereto, and may be provided at an upper portion or a side surface according to the battery pack.

Each battery cell may experience abnormal operating conditions, also known as thermal runaway or thermal events, in which an exhaust gas in the battery cell may be discharged to the outside of the battery cell. The battery pack or battery module may include an exhaust port or the like for discharging the exhaust gas to prevent damage to the battery pack or module by the exhaust gas.

The battery pack may include a battery and a battery management system (BMS) for managing the battery. The battery management system may include a detection device, a balancing device, and a control device. The battery module may include a plurality of cells connected to each other in series or parallel. The battery modules may be connected to each other in series or parallel connection.

Figure 2:
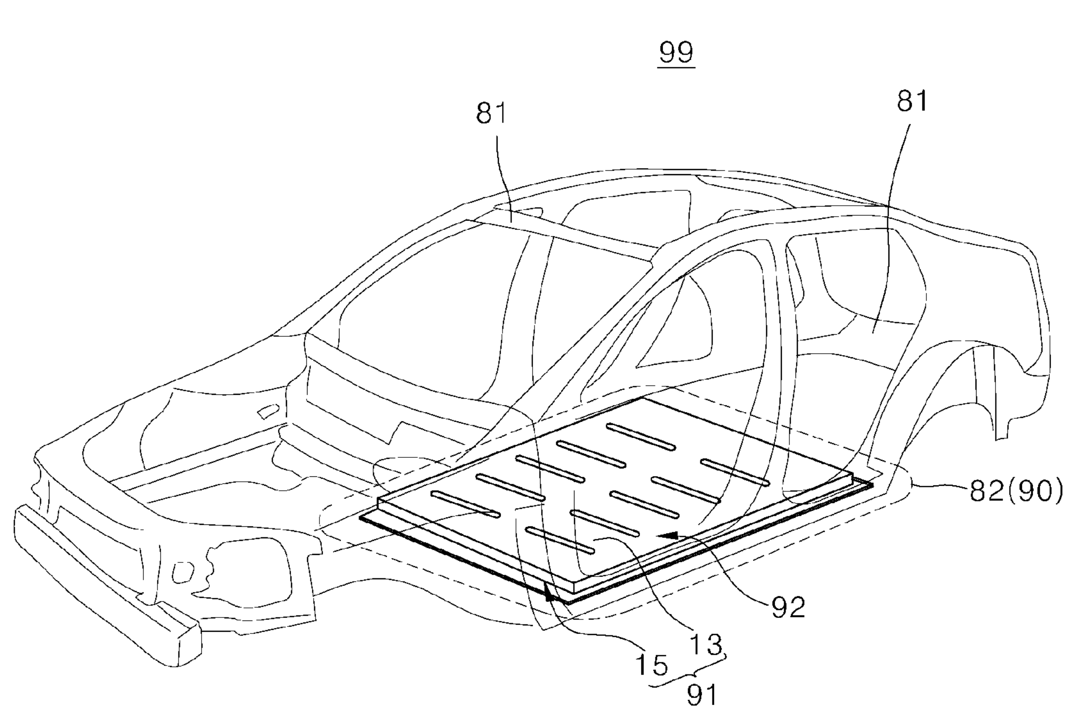
FIG. 2 illustrates an example in which the battery pack according to one embodiment of the present invention is installed in a vehicle body.

FIG. 2 is a view illustrating an example in which the battery pack according to one embodiment of the present invention is installed in a vehicle body.

In FIG. 2, a battery pack 91 may include a battery pack cover 13, which is a part of a vehicle underbody 92, and a pack frame 15 disposed under the vehicle underbody 92. The pack frame 15 and the battery pack cover 13 may have a structure integrally formed with a vehicle bottom 82.

The vehicle underbody 92 separates the inside and the outside of a vehicle, and the pack frame 15 may be disposed outside the vehicle.

Figure 3:
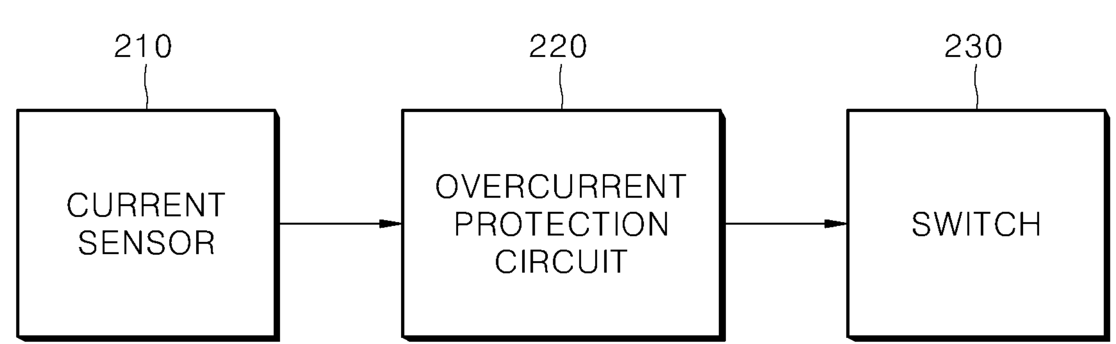
FIG. 3 illustrates a schematic configuration of an overcurrent protection apparatus according to one embodiment of the present invention.

FIG. 3 is a view illustrating a schematic configuration of an overcurrent protection apparatus according to one embodiment of the present invention.

Referring to FIG. 3, an overcurrent protection apparatus 200 includes a current sensor 210, a switch 230, and an overcurrent protection circuit 220.

The current sensor 210 may measure a charging current applied to the battery module of the battery pack 100 or a discharging current output from the battery module.

The current sensor 210 may be connected to at least one of an input terminal and an output terminal of the battery module to measure a current. Further, the current sensor 210 may be connected to the input/output terminal of the battery pack 100 to measure the current. An output of the current sensor 210 has a form of a voltage value corresponding to the measured current.

The switch 230 may be turned on or off according to a signal output from the overcurrent protection circuit 220.

The switch 230 applies the charging current to the battery pack 100 or allows the discharging current output from the battery pack 100 to be applied to the outside in an ON state.

The switch 230 may block the charging current applied to the battery pack 100 or the discharging current output from the battery pack 100 in an OFF state.

The switch 230 may be provided in the battery pack 100 and provided between the input/output terminals of the battery pack 100 and the battery module 50 to apply or block the charging current or discharging current.

The switch 230 may be a relay provided at the input/output terminals of the battery pack 100, and may block the input/output of the battery pack 100.

The switch 230 may be connected between the current sensor 210 and a control device (not shown) to allow a signal or power to be applied to or blocked from the control device.

When the switch 230 is turned off, power supply to the device or system connected to the switch is blocked and the device or system stops operating.

Once the switch 230 is turned off, the OFF state may be maintained until a separate reset signal is input.

The overcurrent protection circuit 220 may be provided between the current sensor 210 and the switch 230 and applies an operation signal to the switch 230 according to an input voltage input from the current sensor 210.

The overcurrent protection circuit 220 outputs the operation signal so that the switch 230 is turned off when the magnitude of the input voltage input from the current sensor 210 is greater than or equal to a reference voltage, and the switch 230 is turned on when the magnitude of the input voltage is less than the reference voltage.

In this case, because it is an overcurrent when the input voltage applied through the current sensor 210 is greater than or equal to the reference voltage, the overcurrent may be prevented from being applied to the battery pack 100 or the control device by turning off the switch 230.

When the overcurrent protection circuit 220 controls the switch 230 so that the switch 230 is turned off, the overcurrent protection circuit 220 may wait for a predetermined time through a delay unit provided therein, and then apply a signal to the switch 230.

When the signal input from the current sensor 210 is changed before reaching a delay time, the overcurrent protection circuit 220 may apply a new operation signal to the switch 230 in response to the changed signal.

The overcurrent protection circuit 220 may apply the operation signal so that the switch 230 is turned off when reaching the delay time.

Once the switch 230 is turned off, because the OFF state is maintained until a separate reset signal is input, the device or system connected to the battery pack 100 becomes a state in which an operation is stopped.

Accordingly, the overcurrent protection circuit 220 may delay turning off the switch 230 for a predetermined delay time to maintain the ON state of the switch 230 for a temporary overcurrent and may protect the device or system by turning off the switch 230 and blocking the overcurrent when the overcurrent is continuously applied.

Figure 4:
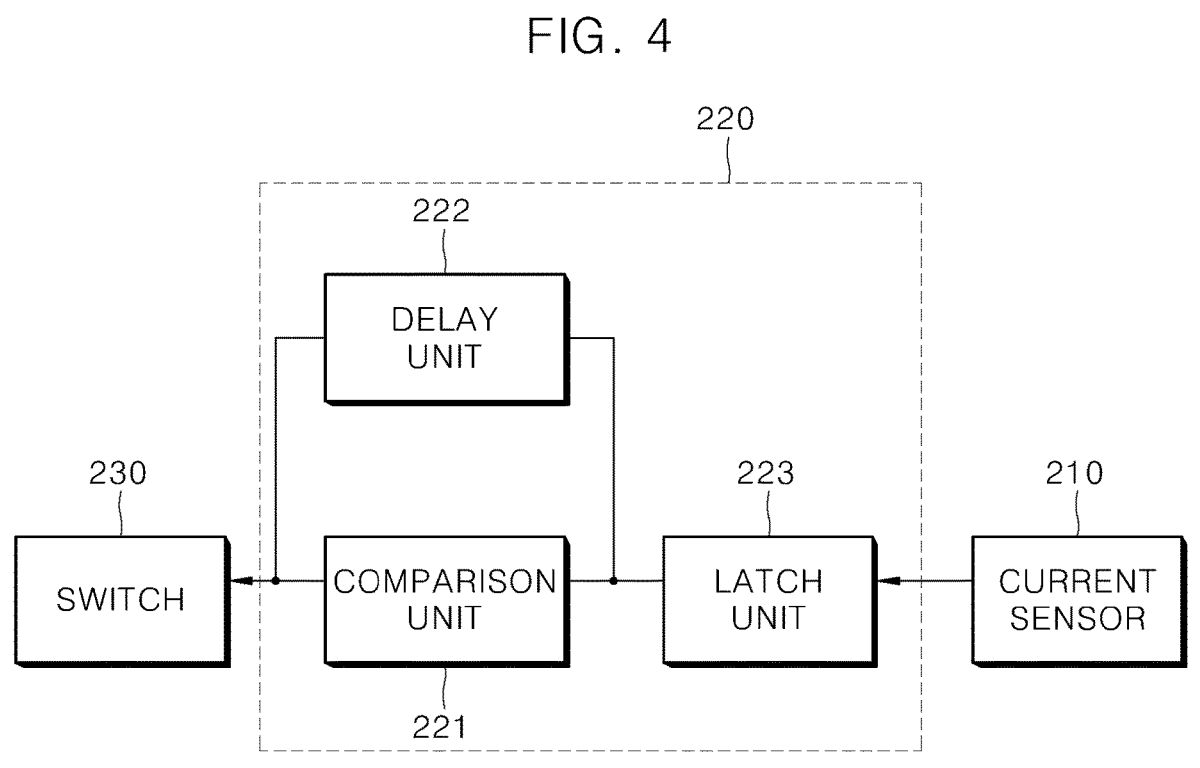

FIG. 4 is a block diagram illustrating a schematic configuration of the overcurrent protection circuit according to one embodiment of the present invention.

Referring to FIG. 4, the overcurrent protection circuit 220 may include a comparison unit 221, a delay unit 222, and a latch unit 223.

The comparison unit 221 may compare the input voltage input from the current sensor 210 and the reference voltage.

The comparison unit 221 may output a high signal when the input signal is greater than or equal to the reference voltage.

The comparison unit 221 outputs a low signal when the input signal is less than the reference voltage.

The delay unit 222 may be connected to an output terminal of the comparison unit 221, and delays the signal output of the comparison unit 221 when a high signal is output from the comparison unit 221. The delay unit 222 may delay the output of a signal to the switch 230 while a capacitor is being charged.

When a high signal is output from the comparison unit 221, the latch unit 223 may maintain application of the high signal of the comparison unit 221 to the input terminal. Accordingly, the comparison unit 221 may continuously output a high signal as a high signal greater than the reference voltage is continuously input.

When a high signal is output from the comparison unit 221, the delay unit 222 may delay the output to the switch 230 for the delay time.

When the delay time elapses, that is, when charging of a capacitor of the delay unit 222 is completed, the comparison unit 221 may output the previously output high signal to the switch 230.

Accordingly, the switch 230 may be turned off in response to the applied high signal.

When a high signal is applied to the output terminal of the comparison unit 221, the high signal of the output terminal may be applied to the input terminal of the comparison unit 221 by the delay unit 222.

The latch unit 223 connected to the input terminal of the comparison unit 221 may allow a high signal to be continuously applied to the input terminal of the comparison unit 221 after the delay time elapses.

Accordingly, the comparison unit 221 may continuously output the high signal as the high signal greater than the reference voltage is input to the input terminal.

Meanwhile, when the comparison unit 221 outputs a low signal, the delay unit 222 does not operate. As the delay unit 222 does not operate, the latch unit 223 also does not operate.

The low signal from the comparison unit 221 may be applied to the switch 230 through the output terminal. The switch 230 may maintain the ON state in response to the low signal.

The switch 230 may be turned off and block a connection of the battery pack 100 when a high signal is applied. When the switch 230 is turned off, the discharging current of the battery pack 100 may be blocked and the connected device or system may stop operating. Further, when the switch 230 is turned off, charging of the battery pack 100 may be stopped.

Figure 5:
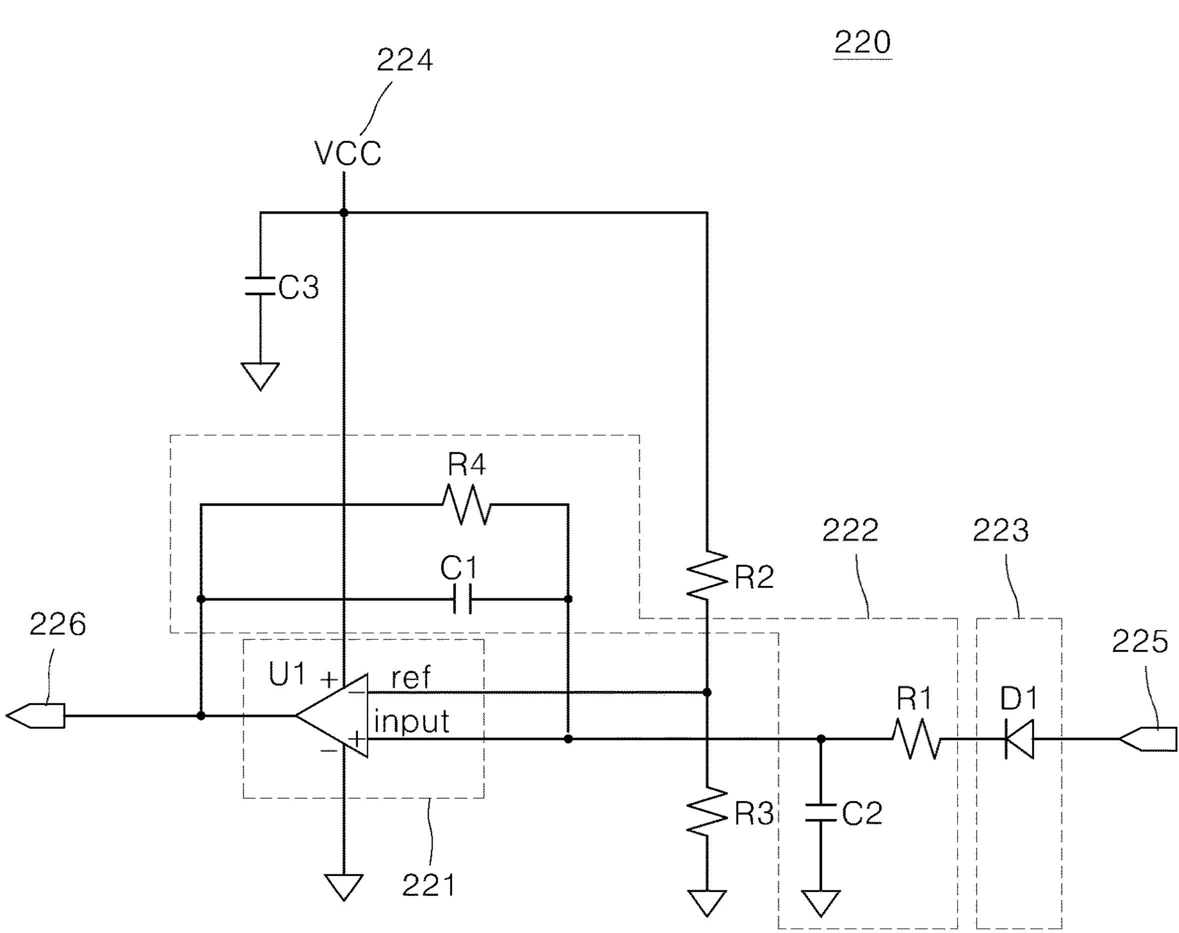
FIG. 5 illustrates a circuit configuration of the overcurrent protection circuit according to one embodiment of the present invention.

FIG. 5 is a view illustrating a circuit configuration of the overcurrent protection circuit according to one embodiment of the present invention.

Referring to FIG. 5, in the overcurrent protection circuit 220, an input terminal 225 may be connected to the output terminal of the current sensor 210, and an output terminal 226 may be connected to the switch 230.

The comparison unit 221 may include an operational amplifier (OP AMP) U1.

The delay unit 222 may include a plurality of capacitors and a plurality of resistors.

The latch unit 223 may include a first diode D1. In the first diode D1, an anode may be connected to the input terminal 225, and a cathode may be connected to the input terminal of the comparison unit 221.

In the comparison unit 221, one end of the input terminal may be connected to the current sensor 210, and the other end may be connected to a reference voltage (Vcc) 224.

The reference voltage (Vcc) 224 may be connected to a third capacitor C3 and may be connected to a second resistor R2 and a third resistor R3.

The reference voltage (Vcc) 224 may be divided at a predetermined ratio according to the magnitudes of the resistance of the second resistor R2 and the resistance of the third resistor R3 and may input the reference voltage to the comparison unit 221. The second resistor R2 may be a resistor having a greater resistance value than the third resistor R3.

The reference voltage may change according to the resistance value, and this may be set based on the input voltage output from the current sensor 210. The reference voltage is set to determine the overcurrent on the basis of the output voltage of the current sensor 210.

The input voltage output from the current sensor 210 may be input to the comparison unit 221 through the first diode D1 and a first resistor R1.

The comparison unit 221 may compare the input voltage output from the current sensor 210 and the reference voltage, and may output a high signal or low signal according to a comparison result.

The comparison unit 221 may be connected to the switch 230 and the delay unit 222.

The delay unit 222 may delay application of the output signal of the comparison unit 221 to the switch 230 through the output terminal 226 of the overcurrent protection circuit 220.

When the voltage at the output terminal of the comparison unit 221 changes from a low signal to a high signal, the output voltage of the comparison unit may be applied to the delay unit 222.

When a high signal is applied to the output terminal of the comparison unit 221, the delay unit 222 may charge a first capacitor C1 and a second capacitor C2 using the high signal of the comparison unit 221.

In the delay unit 222, a hysteresis operation in which the integration characteristics of the delay unit 222 disappear due to the coupling characteristics of the first capacitor C1 and the voltage at the input terminal of the comparison unit 221 increases through the first capacitor C1 may be performed.

Further, when the comparison unit 221 outputs a high signal, the high signal may be applied to the input terminal through a fourth resistor R4, and the second capacitor C2 connected to the input terminal is charged.

Accordingly, until the charging of the capacitor is completed, the delay unit 222 may delay the application of the high signal to the output terminal 226 of the overcurrent protection circuit 220.

In this case, a length of the delay time of the delay unit 222 may be determined according to a value obtained by dividing the capacitance of the first capacitor C1 by the capacitance of the second capacitor C2. A capacitor having a greater capacity than the second capacitor C2 may be used as the first capacitor C1.

Further, the delay time of the delay unit 222 may be determined according to the magnitudes of the resistance of the fourth resistor R4 connected to the output terminal of the comparison unit 221 and the resistance of the first resistor R1 connected to the input terminal of the comparison unit 221. A resistor having a greater resistance value than the first resistor R1 may be used as the fourth resistor R4.

Even when the charging of the capacitor is completed, a high signal may be applied to the input terminal of the comparison unit 221 by the first diode D1 of the latch unit 223.

In some embodiments, the comparison unit 221 may output a high signal as a high signal higher than the reference voltage that may be applied to the input terminal.

Because the capacitor of the delay unit 222 is in a charged state, the high signal applied to the output terminal of the comparison unit 221 may be applied to the switch 230 through the output terminal 226 of the overcurrent protection circuit 220.

Accordingly, the switch 230 may be turned off, and as the output of the comparison unit 221 maintains the high signal, the switch 230 may maintain the OFF state.

Figure 6:
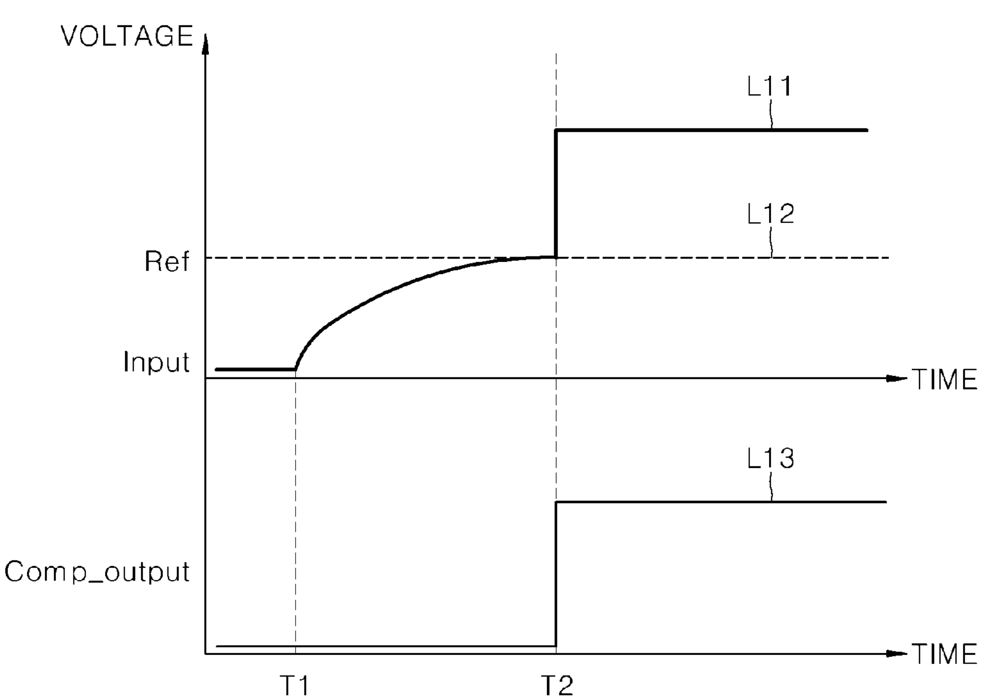
FIG. 6 is a graph of voltage change of the overcurrent protection circuit according to one embodiment of the present invention.

FIG. 6 is a graph illustrating a voltage change of the overcurrent protection circuit according to one embodiment of the present invention.

Referring to FIG. 6, when an overcurrent is detected by the current sensor 210, the overcurrent protection circuit 220 may delay the output to the switch 230 to operate the switch 230 by distinguishing between temporary overcurrent and continuous overcurrent phenomena.

When an overcurrent or overvoltage is detected by the current sensor 210, the overcurrent protection circuit 220 may delay the output of the high signal from the comparison unit 221 through the delay unit 222 and the latch unit 223.

A reference voltage L12 having a predetermined magnitude may be applied to a first input terminal Ref of the comparison unit 221.

The input voltage input from the current sensor 210 may be applied to a second input terminal Input of the comparison unit 221.

The comparison unit 221 may compare the reference voltage L12 of the first input terminal and the input voltage of the second input terminal to output a high signal or low signal. The comparison unit 221 may output a high signal when the input voltage is greater than or equal to the reference voltage, and may output a low signal when the input voltage is less than the reference voltage.

When an overcurrent is detected by the current sensor 210, the comparison unit 221 may receive an input voltage greater than the reference voltage L12. The comparison unit 221 may output a high signal in response to the input voltage greater than the reference voltage.

At a first time T1, when the input voltage begins to be greater than or equal to the reference voltage, the comparison unit 221 outputs a high signal. When the high signal is output, as the capacitor of the delay unit 222 is charged, an input voltage L11 flowing to the second input terminal Input increases.

While the capacitor of the delay unit 222 is being charged, the high signal output may be delayed and the output terminal of the overcurrent protection circuit 220 may maintain the low signal.

While the capacitor of the delay unit 222 is being charged, the input voltage L11 may increase to the reference voltage L12.

When charging of the capacitor of the delay unit 222 is completed at a second time T2, the input voltage L11 applied to the second input terminal Input may significantly increase. The magnitude of a current of the input voltage L11 may significantly rise above the reference voltage L12, and the input voltage L11 may maintain a predetermined value due to the latch unit 223 as a voltage applied to the second input terminal Input by the fourth resistor R4 is added to an existing voltage flowing through the second input terminal Input based on the second time T2.

Meanwhile, the comparison unit 221 may output a high signal at the first time T1, but because the output of the comparison unit 221 is used to charge the capacitor of the delay unit 222, the signal output to the switch 230 maintains a low state until the second time T2.

However, at the second time T2, because the input voltage L11 of the comparison unit 221 becomes greater than the reference voltage L12, the comparison unit 221 outputs a high signal L13, and because the charging of the capacitor has been completed, the output terminal of the comparison unit 221 outputs a high signal. The switch 230 may be turned off according to the high signal.

As the high signal is continuously applied to the input terminal of the comparison unit 221 by the latch unit 223, the comparison unit 221 may maintain the high signal output (L11). Accordingly, the switch 230 may maintain the OFF state.

Figure 7:
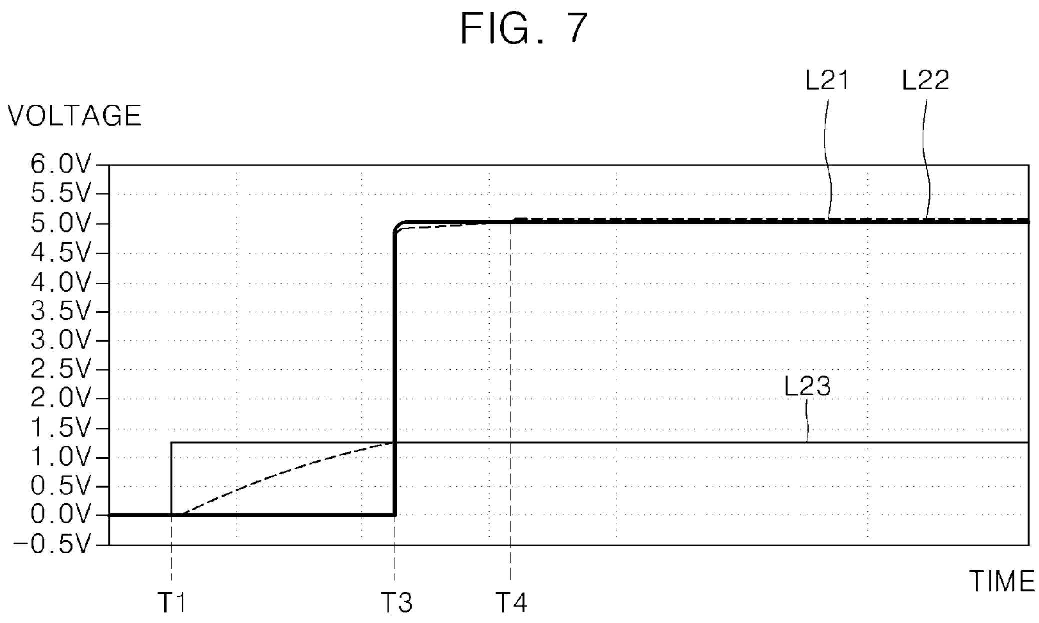
FIG. 7 is a graph of test results of the overcurrent protection circuit according to one embodiment of the present invention.

FIG. 7 is a graph illustrating a test result of the overcurrent protection circuit according to one embodiment of the present invention.

Referring to FIG. 7, when an overcurrent is detected by the current sensor 210, the overcurrent protection circuit 220 may delay the output to the switch 230.

The overcurrent protection apparatus 200 of the present invention may control the switch 230 by distinguishing between a temporary overcurrent and a continuous overcurrent through delay of the output signal of the overcurrent protection circuit 220.

At a third time T3, a reference voltage L22 of approximately 1.25 V may be applied to the comparison unit 221. The reference voltage L22 may be determined according to the magnitudes of the resistance of the second resistor R2 and the resistance of the third resistor R3 previously described in FIG. 5.

The comparison unit 221 may output a high signal when an input voltage is greater than or equal to the reference voltage. However, when the output of the comparison unit 221 changes from low to high, because the capacitor of the delay unit 222 is charged by the output signal of the comparison unit 221, the signal output to the output terminal of the overcurrent protection circuit 220 may be delayed. Accordingly, the switch 230 may maintain the ON state.

The input voltage L21 of the comparison unit 221 may increase from the third time T3 while the capacitor provided in the delay unit 222 is being charged and may reach the same value as the reference voltage L22 at a fourth time T4.

The second capacitor C2 and the first capacitor C1 of the delay unit 222 may be charged from the third time T3 to the fourth time T4.

At the fourth time T4, the magnitude of the input voltage L21 may increase as the output signal (the high signal) is applied to the input terminal Input through the fourth resistor R4 of the delay unit 222.

Because the capacitor of the delay unit 222 is in a charged state, an output voltage L23 of the comparison unit 221 may be applied to the output terminal of the overcurrent protection circuit 220. Accordingly, the switch 230 may be switched from the ON state to the OFF state by the output voltage L23.

The comparison unit 221 may continuously output a high signal as the magnitude of the input voltage is maintained greater than or equal to the reference voltage by the latch unit 223. Accordingly, the switch 230 may maintain the OFF state to block the output of the battery pack 100.

Meanwhile, when a normal current is applied after a temporary overcurrent occurs, because the comparison unit 221 may output a low signal while the output voltage of the comparison unit 221 is delayed, the switch may maintain the ON state.

Figure 8:
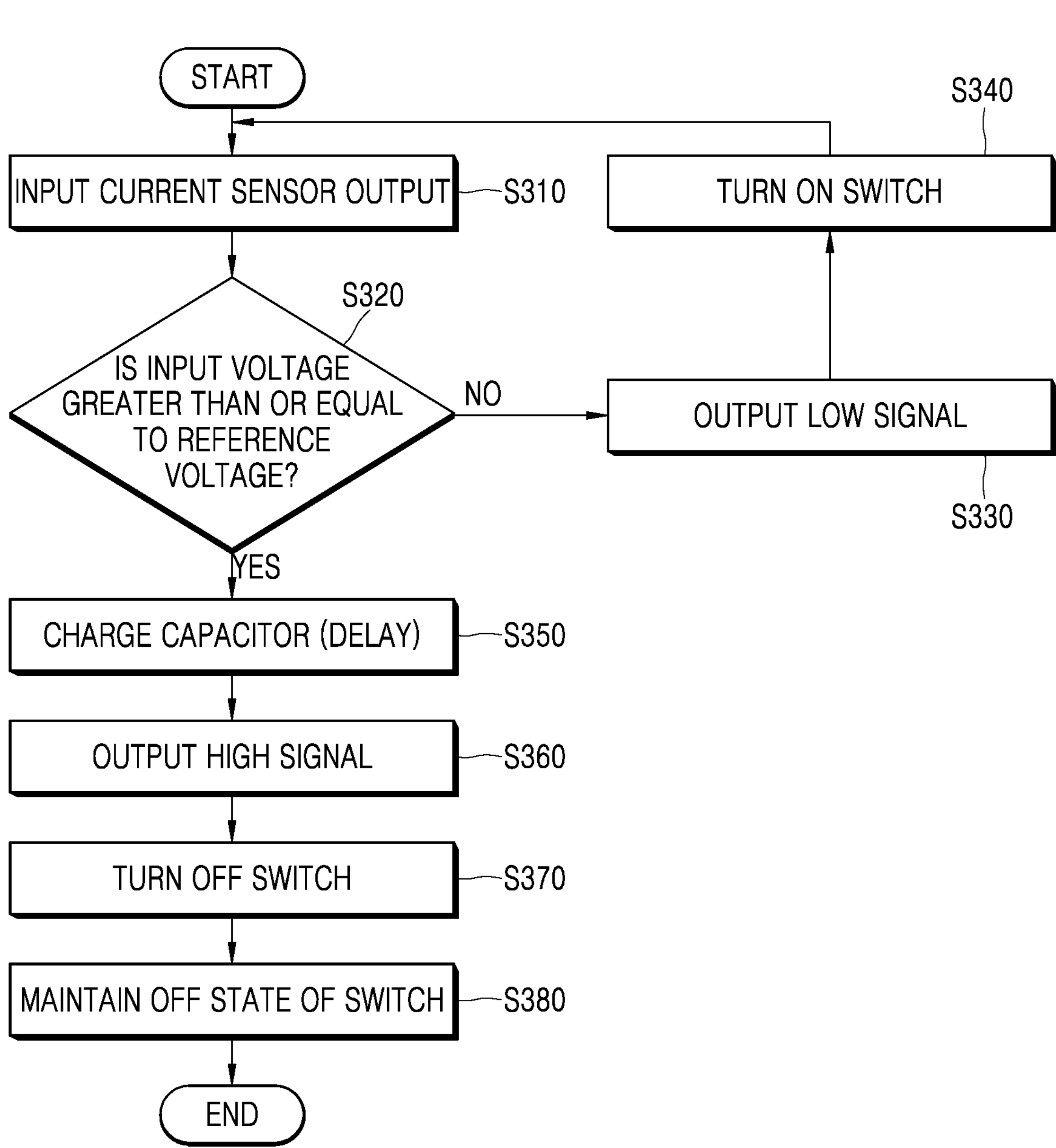
FIG. 8 is a flow chart for a protection method of the overcurrent protection apparatus according to one embodiment of the present invention.

FIG. 8 is a flow chart illustrating a protection method of the overcurrent protection apparatus according to one embodiment of the present invention.

Referring to FIG. 8, the overcurrent protection apparatus 200 may detect the charging current applied to the battery pack 100 or the discharging current output from the battery pack 100 through the current sensor 210. The current sensor 210 may output a signal for the detected current.

The overcurrent protection circuit 220 may be connected to the current sensor 210 and may receive the output of the current sensor 210 as an input voltage (S310).

The comparison unit 221 may compare the reference voltage and the input voltage (S320). In this case, the reference voltage may be divided at a resistance ratio for the reference voltage and applied to the comparison unit 221.

The comparison unit 221 may output a low signal when the input voltage is less than the reference voltage (S330).

The output signal of the comparison unit 221 may be applied to the switch 230 connected to the output terminal.

When the low signal is output, the switch 230 may maintain an ON state (S340). When the switch 230 is in the ON state, the charging current may be supplied to the battery pack 100, or the discharging current of the battery pack 100 may be output.

Meanwhile, the comparison unit 221 may output a high signal when the input voltage is greater than or equal to the reference voltage. The comparison unit 221 may output a high signal in response to an overcurrent or overvoltage.

In this case, when a high signal is output from the comparison unit 221, because the output voltage is applied to the delay unit 222 connected to the comparison unit 221, the capacitor provided in the delay unit 222 is charged (S350).

Accordingly, the delay unit 222 may delay the output of the high signal of the comparison unit 221 to the switch 230 while the capacitor is being charged.

While the output of the comparison unit 221 is delayed, the switch 230 may maintain the ON state.

When the comparison unit 221 continuously outputs a high signal, the delay unit 222 charges the capacitor, and because the output of the comparison unit 221 is connected to the input terminal when the capacitor charging is completed, the input voltage may be greater than or equal to the reference voltage and may be continuously applied to the input terminal of the comparison unit 221 by the latch unit 223.

Accordingly, the comparison unit 221 may output a high signal (S360), and the output high signal may be applied to the switch 230.

The switch 230 may be turned off by the high signal (S370).

As the comparison unit 221 continuously outputs a high signal due to the latch unit 223, the switch 230 maintains the OFF state (S380).

As the switch 230 is turned off, the charging current and discharging current of the battery pack 100 may be blocked, and the device or system including the battery pack 100 may stop operating.

Meanwhile, while the capacitor of the delay unit 222 is being charged (the delay time), when the comparison unit 221 outputs a low signal after outputting a high signal due to a temporary overcurrent, the charging of the capacitor of the delay unit 222 may be stopped, and a low signal may be applied from the comparison unit 221 to the switch 230. Accordingly, the switch 230 may maintain the ON state.

Accordingly, even when a separate control device is not provided, the overcurrent protection apparatus of the present invention may distinguish between a temporary overcurrent and a continuous overcurrent and may delay the operation of the switch in response to a temporary overcurrent through the overcurrent protection circuit to maintain the connection of the battery pack 100. Further, the overcurrent protection apparatus of the present invention may protect the battery pack 100 and the device or system connected to the battery pack from an overcurrent by turning off the switch in response to a continuously occurring overcurrent to block the connection of the battery pack 100.

Although the present invention has been described above with limited embodiments and drawings, the present invention is not limited thereto, and various changes and modifications may be performed by those skilled in the art within the scope of equivalency of the technical spirit of the present invention and the scope of the claims described below.

Implementations described in the present specification may be implemented as, for example, as a method or process, device, software program, data stream, or signal. Although only the context of a singular form of implementation is discussed (for example, only a method is discussed), implementations of discussed features may also be implemented in another form (for example, a device or program). The device may be implemented with appropriate hardware, software, firmware, and the like. The method may be implemented in in devices such as processors, which generally refer to processing devices that include computers, microprocessors, integrated circuits, programmable logic devices, or the like. Further, the processors include communication devices such as computers, laptops, cellular phones, portable/personal digital assistants (PDAs), tablet devices, other devices, etc. that facilitate the communication of information between end-users.

Here, the processor may be implemented as, for example, a central processing unit (CPU) or a system on chip (SoC), and may control a plurality of hardware or software components connected to the processor and perform various types of data processing and calculations by running an operating system or application. The processor may be configured to execute at least one instruction stored in a memory (not shown) and store execution result data in the memory.

According to an embodiment of the present invention, even when an overcurrent is detected, a signal may be output after a predetermined delay time, and thus the problem of system operation stopping due to a temporary overcurrent can be addressed.

According to the embodiment of the present invention, a control device or battery can be effectively protected by blocking a continuously occurring overcurrent.

According to an embodiment of the present invention, an overcurrent can be blocked by configuring a protection circuit without using a microprocessor.

However, effects, which can be acquired through the present invention, are not limited to the above-described effects, and other technical effects, which are not mentioned, will be clearly understood by those skilled in the art from the description of the invention described above.

The present invention is directed to providing an overcurrent protection apparatus, which addresses the problem of system operation stopping due to a circuit being blocked by a temporary overcurrent and protects a control device or battery from a continuous overcurrent, and a protection method thereof.

However, technical problems to be solved by the present invention are not limited to the above-described problems, and other problems, which are not mentioned, will be clearly understood by those skilled in the art from the description of the invention disclosed below.

According to an aspect of the present invention, there is provided an overcurrent protection apparatus including a current sensor configured to measure a charging current or discharging current of a battery pack, a switch configured to connect or disconnect the battery pack, and an overcurrent protection circuit configured to receive an output signal of the current sensor as an input voltage to compare the input voltage and a reference voltage, allow the switch to maintain an on state when the input voltage is less than the reference voltage according to a comparison result, and control the switch so that the switch is turned off after a predetermined time delay when the input voltage is greater than or equal to the reference voltage.

Although the present invention has been described with reference to the embodiments shown in the drawings, these are merely exemplary, and it may be understood that various modifications and equivalents may be performed by those skill in the art. Accordingly, the technical scope of the present invention should be defined by the following claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An overcurrent protection apparatus, comprising:

a current sensor configured to measure a charging current or discharging current of a battery pack;

a switch configured to connect or disconnect the battery pack; and an overcurrent protection circuit configured to receive an output signal of the current sensor as an input voltage to compare the input voltage and a reference voltage, allow the switch to maintain an on state when the input voltage is less than the reference voltage according to a comparison result, and control the switch so that the switch is turned off after a delay of a predetermined time when the input voltage is greater than or equal to the reference voltage wherein:

the overcurrent protection circuit includes a comparison unit configured to compare the input voltage and the reference voltage, and a delay unit configured to delay an output of the comparison unit when a high signal is output from the comparison unit, and the overcurrent protection circuit further includes a latch unit including a diode connected to an input terminal of the comparison unit to maintain the output of the comparison unit to be applied to the input terminal of the comparison unit when a delay time of the delay unit elapses.

2. The overcurrent protection apparatus as claimed in claim 1, wherein the comparison unit outputs a low signal when the input voltage is less than the reference voltage, and outputs a high signal when the input voltage is greater than or equal to the reference voltage.

3. The overcurrent protection apparatus as claimed in claim 2, wherein the comparison unit outputs a high signal when the input voltage rises due to a temporary overvoltage, and outputs a low signal to the switch when the input voltage decreases within a delay time of the delay unit.

4. The overcurrent protection apparatus as claimed in claim 2, wherein the comparison unit outputs a high signal to the switch when the delay time by the delay unit elapses.

5. The overcurrent protection apparatus as claimed in claim 1, wherein the delay unit includes a first capacitor connected to an output terminal of the comparison unit, and delays the output to the switch while the first capacitor is being charged by the high signal of the comparison unit.

6. The overcurrent protection apparatus as claimed in claim 5, wherein the delay unit further includes a resistor connected to the first capacitor in parallel, and allows the output of the comparison unit to be applied to an input terminal of the comparison unit through the resistor when charging of the first capacitor is completed.

7. The overcurrent protection apparatus as claimed in claim 5, wherein the delay unit further includes a second capacitor connected to an input terminal of the comparison unit, and a delay time is determined according to a capacity ratio of the first capacitor and the second capacitor.

8. The overcurrent protection apparatus as claimed in claim 1, wherein the comparison unit continuously outputs a high signal due to the latch unit.

9. An overcurrent protection method, comprising:

comparing, by a comparison unit, an input voltage and a reference voltage when a measurement result for a charging current or discharging current of a battery pack is input as the input voltage from a current sensor;

outputting, by the comparison unit, a signal to a switch connected to the battery pack to allow the switch to maintain an on state when the input voltage is less than the reference voltage;

delaying, by a delay unit, an output signal of the comparison unit for a predetermined time when the input voltage is greater than or equal to the reference voltage; and outputting, by the comparison unit, the output signal to the switch to turn off the switch when a delay time elapses, wherein the turning off of the switch further includes continuously applying the output signal of the comparison unit to an input terminal by a diode of a latch unit connected to the input terminal of the comparison unit.

10. The overcurrent protection method as claimed in claim 9, wherein, in the comparing of the input voltage and the reference voltage, the comparison unit outputs a low signal when the input voltage is less than the reference voltage, and outputs a high signal when the input voltage is greater than or equal to the reference voltage.

11. The overcurrent protection method as claimed in claim 9, wherein the delaying includes charging a first capacitor connected to an output terminal of the comparison unit using a high signal of the comparison unit.

12. The overcurrent protection method as claimed in claim 11, wherein the delaying further includes maintaining, by the switch, the on state until charging of the first capacitor is completed.

13. The overcurrent protection method as claimed in claim 11, wherein, in the delaying, the delay time is determined according to a capacity ratio of the first capacitor of the delay unit and a second capacitor connected to an input terminal of the comparison unit.

14. The overcurrent protection method as claimed in claim 9, wherein the delaying includes outputting, by the comparison unit, a low signal to the switch when the input voltage decreases within the delay time.

15. The overcurrent protection method as claimed in claim 9, wherein the turning off of the switch includes outputting, by the comparison unit, a high signal to the switch when the delay time elapses, and turning off the switch by the high signal.

16. The overcurrent protection method as claimed in claim 15, wherein the turning off of the switch further includes applying the output signal of the comparison unit to an input terminal such that the input voltage rises, when the delay time elapses.

17. The overcurrent protection method as claimed in claim 15, wherein the turning off of the switch further includes turning off the switch and blocking a connection of the battery pack.

* * * * *